UNITED STATES PATENT OFFICE.

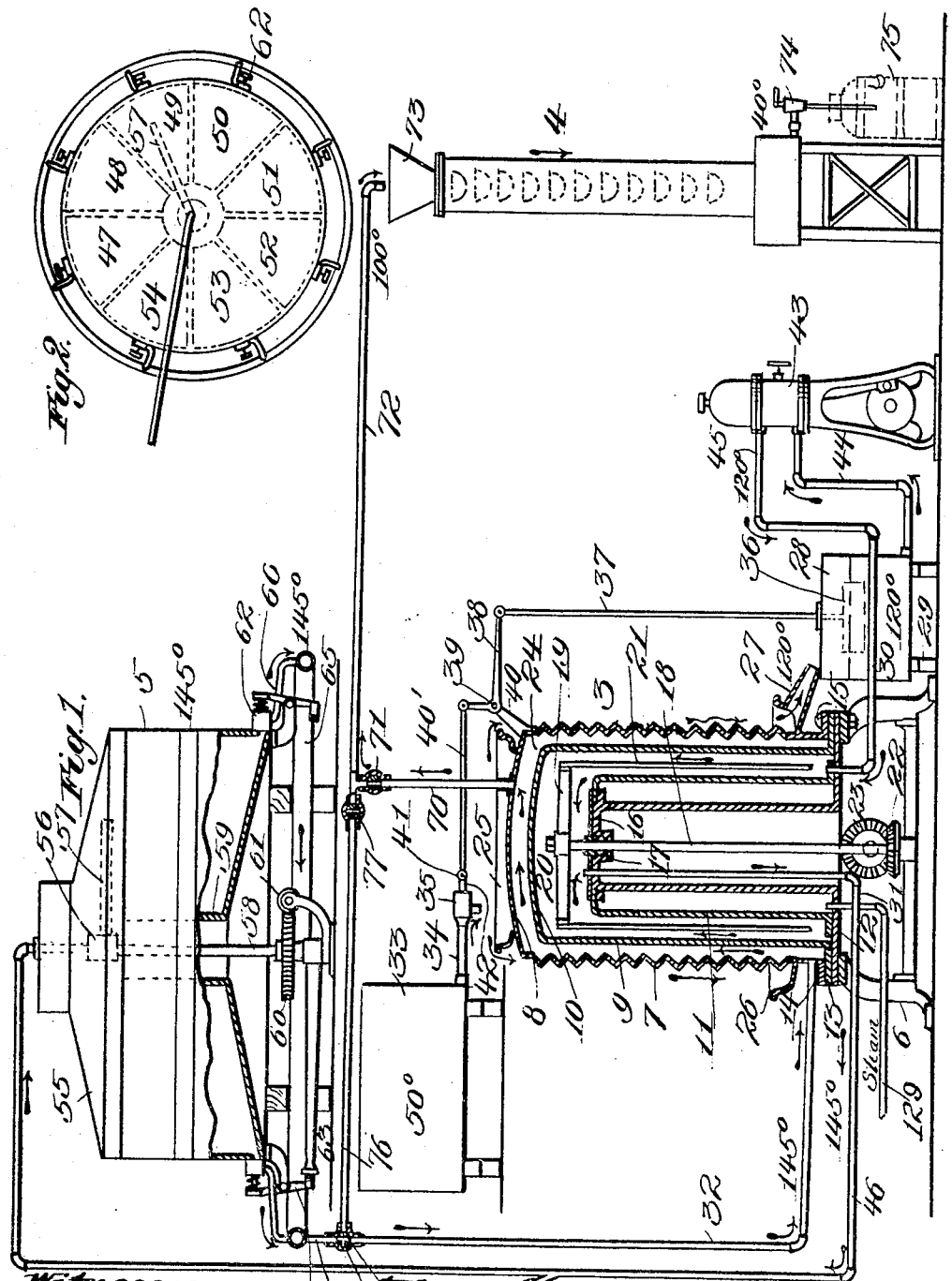

JOSEPH WILLMANN, OF SHELTON, CONNECTICUT.

PROCESS OF PASTEURIZING MILK.

No. 913,600.

Specification of Letters Patent.

Patented Feb. 23, 1909.

Application filed May 25, 1908. Serial No. 434,947.

*To all whom it may concern:*

Be it known that I, JOSEPH WILLMANN, a subject of the Emperor of Germany, residing at Shelton, in the county of Fairfield and State of Connecticut, have invented new and useful Improvements in Processes of Pasteurizing Milk, of which the following is a specification.

This invention relates to a process of pasteurizing milk, and the object thereof is to provide a process in a manner as hereinafter set forth whereby the milk is perfectly pasteurized in a continuous manner and without the intermittent discontinuing of the heating of the milk to a pasteurizing temperature.

The primary object of the process in accordance with this invention is to entirely eliminate the pathogenic bacteria, at the same time preserving the cream line and rendering the milk thoroughly digestive, whereby an absolutely safe and harmless product is set up.

Briefly described the process consists of the following steps:—The milk is heated to a temperature of from 140 to 152° F. in a suitable vessel, after which the hot steady stream enters a suitable holding device, where it is kept automatically from twenty to thirty minutes at such temperature and after which it is discharged in a steady flow either through the regenerative department of a pasteurizer or over or through a cooler into a can or bottle filler. The holding of the milk for a predetermined time at a predetermined temperature destroys all of the bacteria contained in the milk, at the same time preserving the cream line and does not render the albumen hard to digest. The method as herein set forth not only destroys the germ life in the milk, but at the same time the characteristics of the milk are preserved, so that the milk will not only be pure and wholesome, but will keep for much longer periods of time than if not pasteurized in accordance with the process set forth herein.

As showing one form of an apparatus capable of carrying out the method, reference is had to the accompanying drawings, in which:—

Figure 1 is a sectional elevation of a pasteurizing apparatus by which the process can be carried out, and Fig. 2 is a plan of a container.

Referring to the drawings in detail, 3 denotes generally a pasteurizer, 4 a cooler and 5 a container. The pasteurizer embodies a base 6, a corrugated outer section 7 closed at its top as at 8, an intermediate section 9 closed at its top as at 10, and a chambered inner section 11 the bottom wall 12 of which is extended and mounted upon the base 6. The section 9 is flanged as at 13 and rests upon the extended portion of the inner section and the corrugated outer section is flanged as at 14 and rests upon the flange 13. The extension 12 as well as the flanges 13 and 14 are secured together by the hold-fast devices 15. The top 16 of the inner section 11 is provided with a stuffing box 17 through which projects a vertically extending shaft 18 which on its upper end has secured thereto a supporting arm 19 positioned in a chamber 20 formed between the inner section 11 and the intermediate section 9. The arm 19 has depending therefrom the agitators 21 which when the shaft 18 is rotated revolve within the chamber 20. The lower end of the shaft 18 has connected therewith a bevel gear 22 meshing with the crown gear 23, the latter being operated from any suitable source of power. The pasteurizer 3 further embodies a chamber 24 formed by the intermediate section 9 and the outer section 7. Mounted upon the latter is a receiving tray 25 for the milk to be pasteurized and surrounding the section 7 near the lower end thereof is a collecting trough 26 having an outlet 27 which opens into a tank 28 mounted upon the supports 29. The chamber formed by the inner section 11 of the pasteurizer has communicating therewith a steam supply pipe 129, the chamber 20 has a milk supply pipe 30 and a milk discharge pipe 31, and the chamber 24 has communicating therewith a milk supply pipe 32.

The reference character 33 denotes a reservoir having an outlet 34 controlled by an automatically operable shut-off 35. The milk as it leaves the reservoir 33 is supplied to the tray 25 and over-flows the edge of the tray and travels down the corrugated outer section 7 and is collected in the trough 26. The milk when collected in the trough 26 owing to its travel over the outer section 7 has been heated to a temperature of 120°. The milk stored in the reservoir 33 is of a temperature of 50°. The milk is discharged from the trough 26 at a temperature of 120° into the tank 28. Within the tank 28 is a float 36 connected by a rod 37 with a bell crank 38 which is pivoted as at 39 to an arm 40 formed integral with the outer section 7 of the pasteurizer. To the bell crank 38 is pivotally connected a shifting rod 40' which is also pivotally connected as at 41 to the stem 42 of the automatically controlled cut-off. By such an arrangement it is evident that the supply of milk from the reservoir 33 can be controlled by the quantity of milk within the tank 28. This is evident, as when the float 36 rises it will tend to close the cut-off, but when the float lowers the cut-off will be operated in an opposite direction, whereby an increased quantity of milk can be supplied from the reservoir 33.

The reference character 43 denotes a pump which communicates by the suction pipe 44 with the bottom of the tank 28 and the function of the pump 43 is to withdraw the heated milk from the tank 28 and force the same back into the pasteurizer 3, the milk entering the chamber 20 at the bottom thereof where it transmits most of its heat to the incoming cold milk. While the milk is being heated in the chamber 20, it is agitated through the medium of the agitators 21. The pump 43 communicates with the chamber 20 through the medium of the supply pipe 45. The milk as it leaves the tank 28 is of a temperature of 120° and is forced back into the chamber 20 at such temperature. The heating of the milk in the chamber 20 as well as when it flows over the outer section 7 is had through the medium of the steam jacket formed by the inner section 11. After the milk has been brought to a temperature of 145° without discontinuing the flow of the milk through the pasteurizer, it is discharged from the chamber 20 through the medium of the discharge pipe 46 which has one end thereof opening into the chamber 20 near the top of the latter. The milk is conducted through the medium of the pipe 46 at for instance a temperature of 145° into the container where the milk is held a predetermined length of time at said temperature of 145° and without discontinuing the operation of the pasteurizer.

The container 5 is constructed in such manner as to maintain the temperature of the milk at for example 145° for a predetermined length of time, say from twenty to thirty minutes, the loss of heat being usually negligible, perhaps one-half a degree such action killing the pathogenic germs, but without eventually changing the cream line of the milk or causing the albumen to be hard to digest. By way of example the container 5 is shown consisting of a cylindrical receptacle divided into a series of compartments 47, 48, 49, 50, 51, 52, 53, 54. The number of compartments is shown by way of example, the number being increased or diminished according to the quantity of milk desired to be treated. A cover 55 is provided for the receptacle, through which extends the pipe 46, the latter depending into the container and opening into a receiver 56 which is provided with a spout 57 for discharging the heated milk successively into the various compartments of the container. The receiver 56 is mounted upon the upper end of a revolving shaft 58 which extends up through a sleeve 59 arranged centrally of the container and by such an arrangement it is evident that when the shaft 58 rotates the receiver 56 is carried therewith and causes the spout to be positioned successively over the various compartments of the container and successively fill them. The shaft 58 carries a worm wheel 60 meshing with a worm 61 driven by suitable means not shown. Each of the compartments 47 to 54 is provided with an automatically operable outlet valve 62, each of the valves 62 being operated at predetermined intervals so as to cause the compartments to successively empty. The shaft 58 revolves at a predetermined rate of speed and in this connection it will be stated that during the supply of milk to the compartments of the container 5, the shaft 58 is adapted to be revolved at such a rate of speed as to enable the milk to be held a predetermined time at the temperature at which the milk is delivered into the container. If this time, is, for instance, say fifteen minutes, the speed of the shaft will be such as to make one revolution in every twenty-four minutes, as it would be necessary to keep the milk in the compartments for a period of fifteen minutes and it will have to eventually cause the filling of all the compartments.

It will be assumed that compartments 54, 53, 52, 51 and 50 are filled, compartment 49 filling, compartment 48 empty and compartment 47 emptying. After compartment 49 has been filled and the spout is moved over compartment 48 the exhaust valve will be closed to compartment 47, as this compartment will have been emptied by this time. The actuating device for the exhaust valve mechanism to be hereinafter referred to will then have to be moved to a position to open the outlet of compartment 54. After the filling of compartment 48, the spout is then moved over compartment 47 to cause the filling thereof and the tripping device will close the exhaust valve mechanism of compartment 54 which has been emptied by this time and the tripping device will move on to open the outlet to compartment 53 so that said compartment can be emptied. This operation is had without discontinuing or cutting off the flow of milk through the pipe 56 from the pasteurizer 3 and is also continued until all the milk has been exhausted from the pasteurizer 3. The tripping device or actuating means for each of the exhaust valve mechanisms 62 consists of an elongated arm 63 carried by the shaft 58 and adapted to engage a shifting lever 64 which actuates the exhaust valve mechanism. Arranged below the container 5 is a common receiving pipe 65 to all of the compartments in the container and communication is had between said pipe 65 and each of the exhaust valve mechanisms 62 by a branch pipe 66.

In some instances it has been found advantageous to again pass the milk through the pasteurizer 3 after it has been held a predetermined period within the container and for such purpose a branch pipe 67 is provided which communicates at one end with a pipe 65 and at its other end with a two-way valve casing 68, the valve being indicated by the reference character 69. The pipe 32 communicates at one end with the casing 68 and at its other end with the chamber 24. If the valve 69 is in the position shown in Fig. 1, the milk is discharged from the pipe 65 into the chamber 24 and is again heated, after which it is discharged from the chamber 24 into the cooler 4 and for such purpose a branch pipe 70 provided with a cut-off 71 communicates with a chamber 24 and with the conducting pipe 72 which opens into a funnel 73, the latter constituting the entrance for the cooler 4. The milk as it enters the regenerative chamber 24 has a temperature of say 145° but is discharged into the cooler at a temperature of 100°. The milk leaves the cooler through the discharge spout 74 at a temperature of 40° and is received in a vessel 75 or other suitable means. The milk can be conducted from the container 5 directly to the cooler and for such purpose a branch conducting pipe 76 is provided which has a cut-off 77. The pipe 76 communicates with a valve casing 68 and with the conducting pipe 72. When it is desired to conduct the milk at 145° from the container 5 to the cooler 4, the valve 68 is shifted so as to establish communication between the pipes 67 and 76 and the valve 77 shifted so as to establish communication between the pipes 76 and 72. The cut-off 71 and the pipe 70 are closed.

Fahrenheit temperatures have been given in the preceding specification, and in each case, it will be obvious that the pasteurizing temperature at which the milk is heated and held is considerably below the boiling point so that while the dangerous bacilli are destroyed or rendered harmless, the properties of the liquid will not be injured. In the drawing and specification, it is stated that the milk may be heated to a temperature of 145° Fahrenheit, but it will be understood of course that this temperature is given merely as an example and that this temperature may vary one way or another within a range of temperature which will insure the pasteurization of the bacilli without coagulating the albumen in the milk, it being possible to vary the temperature, say, between 140° and 152° Fahrenheit.

What I claim is:—

1. A process of pasteurizing milk which consists in heating the milk to a pasteurizing temperature while the milk flows continuously, and then maintaining the milk at such pasteurizing temperature and for such a period of time as will suffice to kill or render harmless the bacteria without coagulating the albumen in the milk and without discontinuing the flow of milk while being heated.

2. A process of pasteurizing milk which consists in heating the milk to a pasteurizing temperature while the milk flows continuously, then maintaining the milk at such pasteurizing temperature and for such a period of time as will suffice to kill or render harmless the bacteria without coagulating the albumen therein and without discontinuing the flow of milk while being heated, and then cooling the milk.

3. A method of pasteurizing milk which consists in heating a continuously flowing body of milk to a temperature of from 140° to 152° Fahrenheit, and then maintaining the milk for such a predetermined time at said temperature as will suffice to kill the bacteria without coagulating the albumen contained in the milk and while the milk flows continuously.

4. A method of pasteurizing milk comprising the heating of a continuously flowing body of milk to a temperature of from 140° to 152° Fahrenheit, then maintaining the milk for such a predetermined time at said temperature as will suffice to kill the bacteria contained in the milk without coagulating the albumen therein and without discontinuing the flow of the milk while being heated to the temperature set forth, and then cooling the milk.

5. A method of pasteurizing liquids which consists in heating a continuously flowing liquid to a pasteurizing temperature, and then uniformly holding every portion of the liquid at such pasteurizing temperature while the liquid continues to flow and for a period of time sufficient to kill or render harmless the bacteria without coagulating the albumen therein.

6. A method of pasteurizing liquids which consists in heating a flowing body of liquid to a temperature of from 140 to 152° Fahrenheit, then holding the liquid at such temperature for a period of time sufficient to destroy or render harmless the bacteria contained therein without coagulating albuminous matter and while the liquid continues to flow during the heating thereof.

7. A method of pasteurizing liquids which consists in heating a continuously flowing liquid to a temperature ranging between 140 and 152° Fahrenheit, then maintaining such liquid at such temperature for a period sufficient to destroy or render harmless the bacteria therein without destroying albuminous matter and while the said liquid is continuously discharging.

8. A method of pasteurizing milk which consists in heating a continuously flowing body of milk to a pasteurizing temperature insufficient to coagulate the albumen therein, and then holding the milk thus heated for a period of time sufficient to kill the pathogenic organisms therein without coagulating the albumen or destroying the cream line and while the said body of milk flows continuously.

In testimony whereof I have hereunto set my hand in presence of two subscribing witnesses.

JOSEPH WILLMANN.

Witnesses:
　MURIEL I. DAVIS,
　HOWARD B. PECK.